Figure 1:
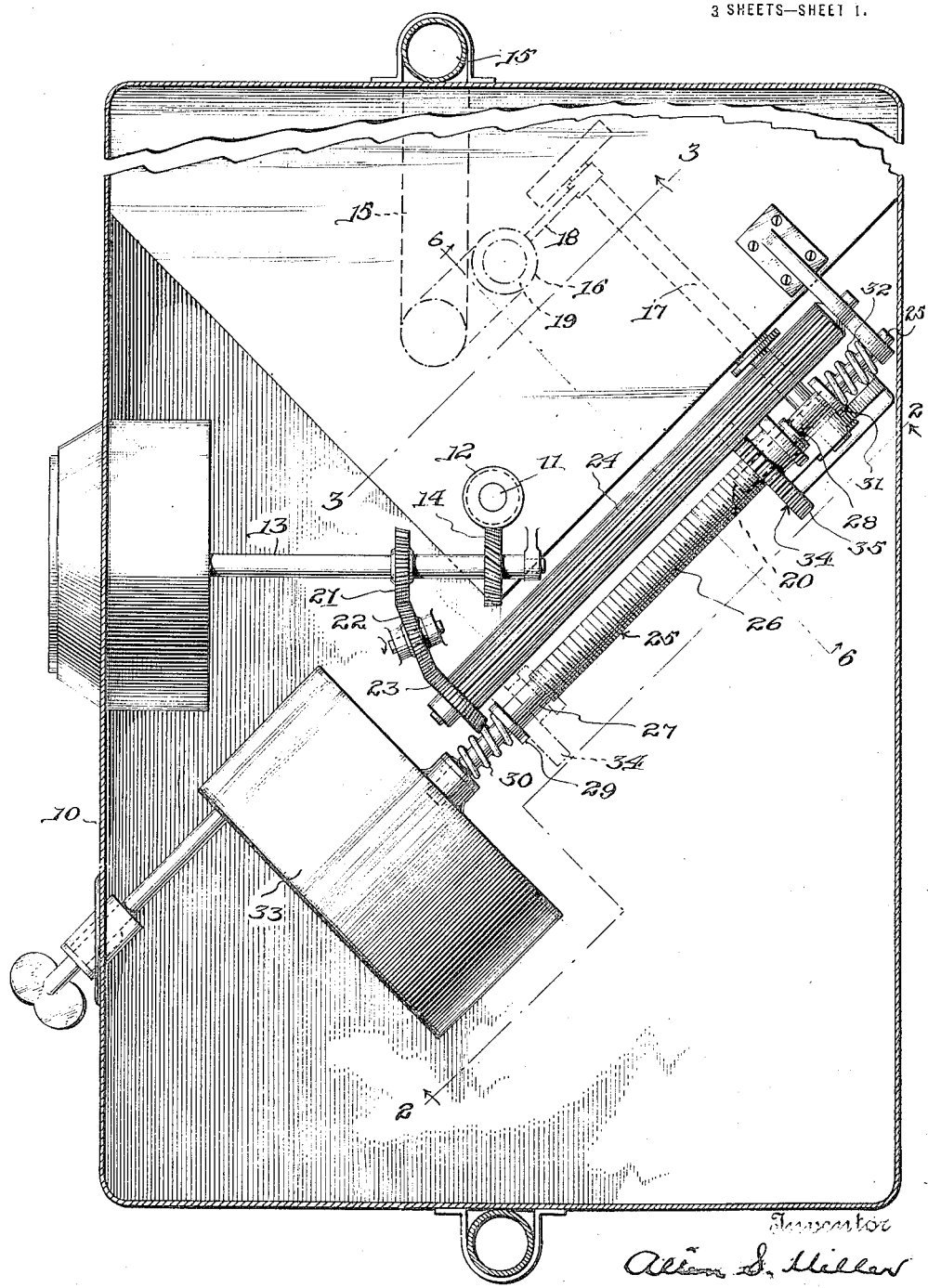

A. S. MILLER.
AUTOMATIC MECHANISM FOR CONTROLLING THE FLOW OF FLUIDS.
APPLICATION FILED DEC. 28, 1921.

1,438,847.

Patented Dec. 12, 1922.
3 SHEETS—SHEET 1.

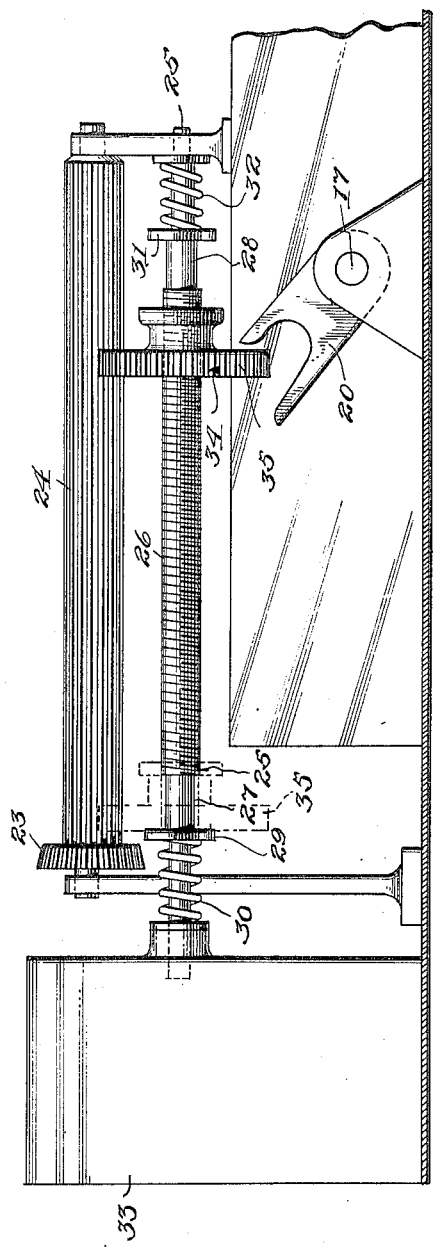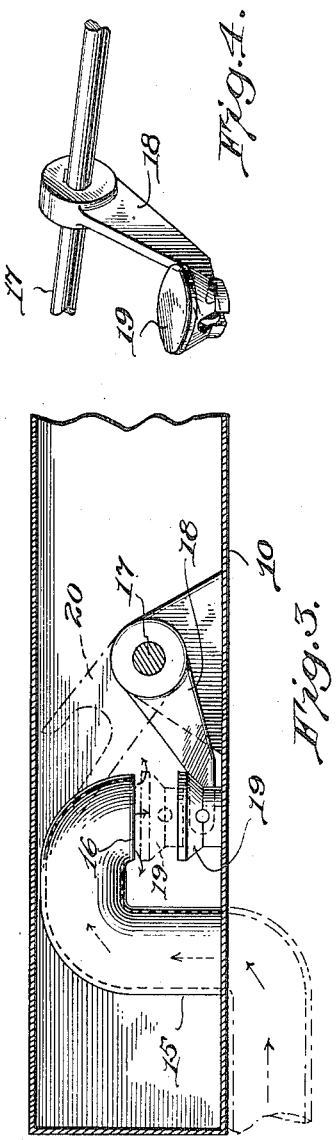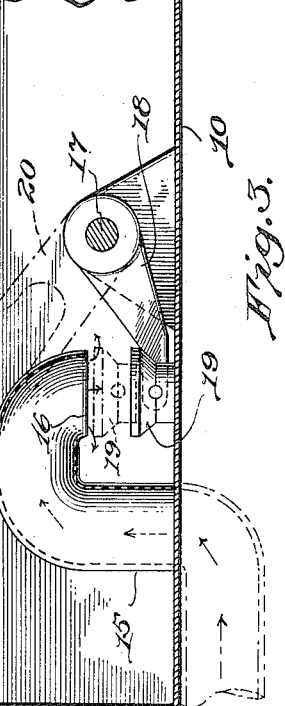

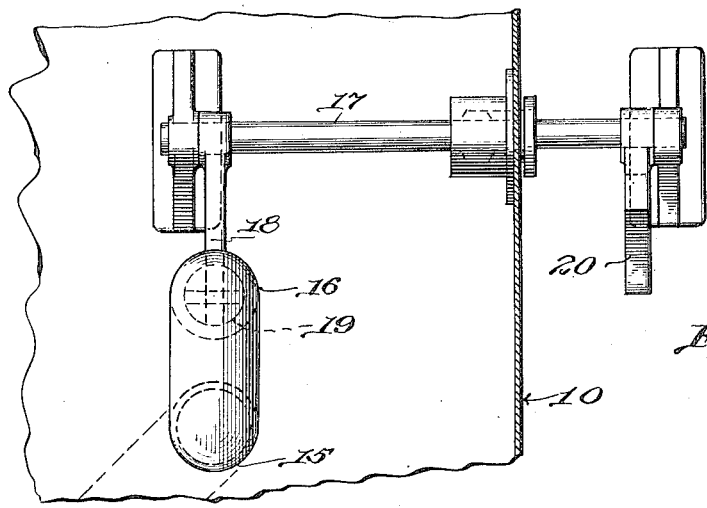
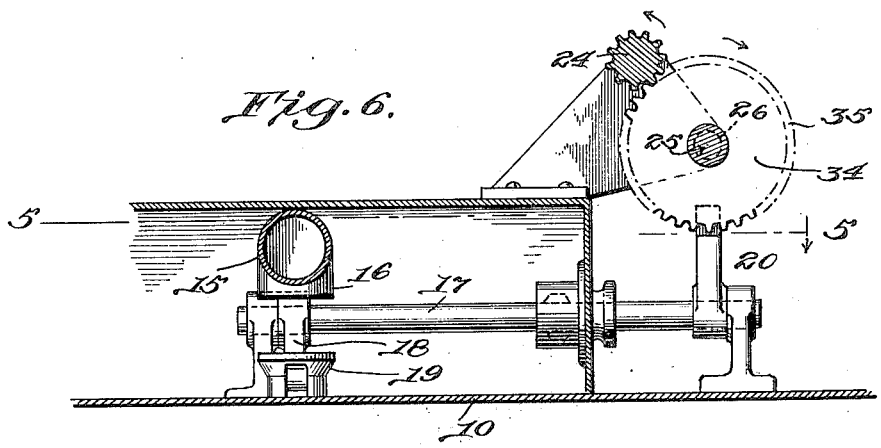
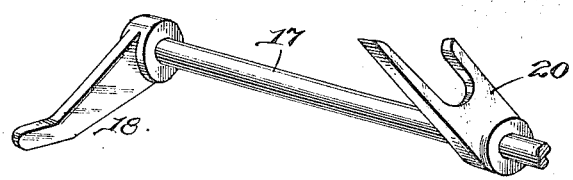

Patented Dec. 12, 1922.

1,438,847

UNITED STATES PATENT OFFICE.

ALTEN S. MILLER, OF BALTIMORE, MARYLAND.

AUTOMATIC MECHANISM FOR CONTROLLING THE FLOW OF FLUIDS.

Application filed December 28, 1921. Serial No. 525,502.

*To all whom it may concern:*

Be it known that ALTEN S. MILLER, a citizen of the United States, residing at Baltimore, in the State of Maryland, has invented certain new and useful Improvements in Automatic Mechanism for Controlling the Flow of Fluids, of which the following is a specification.

This invention relates to a mechanism for controlling the flow of fluids, substances or materials.

The terms "fluids, substances or materials" as herein employed by me are intended to include any substance, material or thing that may flow, or by its passage will actuate a mechanism that will measure the quantity passing.

For example, gas, steam, liquids or semi-liquids, electricity, granular or powdered substances and perhaps other things, during their flow or passage may be passed through a meter and measured,—the very passage of the thing involved being utilized to actuate the meter mechanism.

The present invention therefore may be utilized in connection with any meter or mechanism which is actuated by the thing which is being measured.

I am fully aware that it is not technically accurate to term electricity a fluid, substance or material, but it is a well-known fact that, whatever electricity may be, it is readily measured or metered and therefore the present invention is as applicable to the control of the so-called flow of electric current as it is to gas or any fluid and the terms fluid, substances or materials as herein used by me are therefore to be construed to include the control of electric current.

In the case of gas, the problem of consumption is one which is giving gas companies considerable concern, particularly with respect to large groups of consumers, who at intervals only, will consume vastly greater quantities of gas in a given period of time than during any other like period in a month or year.

Such intermittent use of great quantities of gas makes it necessary, if the demands upon the supply are met, for a company to maintain a plant, or source of supply, the capacity of which is only intermittently called into use and therefore is unprofitably operated.

Either the supply of gas will be inadequate at times or an unprofitable investment must be maintained if the supply must be such as to meet sudden and intermittent demands made upon it.

These conditions are assuming such proportions that a remedy must be provided.

An object therefore, of the present invention is to provide means whereby to limit the total volume of gas or other fluid supplied to a consumer during a predetermined period of time, but at the same time permit that consumer to use his allotted volume of gas or fluid during any portion of the said time period he may desire, after which, the supply will be either entirely cut off or cut down to a minimum.

I am aware that coin-controlled meters have been used whereby after a prepaid quantity or volume of gas has been consumed, the supply will be cut off.

I am also aware that devices have been proposed whereby the flow of gas will be uniformly restricted.

Neither of these devices however meet the conditions hereinbefore referred to by me, because, in the case of the coin-controlled meter the supply or volume of gas is not restricted if the consumer makes the necessary prepayment. Neither is there any time element involved in such coin-controlled meters.

As to the devices that uniformly restrict the flow of gas, they fail to meet the conditions referred to by me, because they do not permit the consumer to use his total allotted volume of gas in a period of time less than a predetermined time period, so that at no time can such consumer use his allotted volume of gas, say in four hours, if the flow is so restricted that twelve hours must be consumed before that allotted volume can be delivered from the restricted supply.

By means of my invention the consumer may use his total allotted volume of gas in any fractional portion of the predetermined time period but the flow will be cut off or cut down when that allotted volume has been used.

Various forms of apparatus may be used to carry my invention into commercial effect, but I have elected to show one form of structure, because of its simplicity and applicability to apparatus now used by the consumer, without however intending that such disclosure shall in any way be construed as defining the scope of the invention.

The accompanying drawings therefore illustrate one form of structure wherein,—

Fig. 1. shows a gas meter in top view to which my improved device is attached.

Fig. 2. illustrates the improved device in side elevation as the same would appear if viewed on the line 2—2 of Fig. 1.

Fig. 3. shows a cross-sectional detail taken on the line 3—3 of Fig. 1, and shows the gas-supply pipe to the intake side of the meter and the valve for controlling the flow of gas from said pipe to the meter.

Fig. 4. illustrates the valve and its actuating means in perspective.

Fig. 5. shows the valve-actuating shaft and the means carried thereby for rocking the same,—the devices being shown as viewed on the line 5—5 of Fig. 6.

Fig. 6. illustrates a cross-sectional detail through the improved devices as the same would appear if viewed on the line 6—6 of Fig. 1, and Fig. 7. shows the detached valve-shaft and the means carried thereby for rocking the shaft and for actuating the valve.

The present disclosure shows the invention combined with a well-known type of gas meter 10 wherein the meter mechanism is operated through a revolving vertical shaft 11 which latter is driven through the movement of bellows devices, (not shown) but which are actuated by the gas or fluid passing through the meter in a well-known manner.

The vertical shaft 11, carries a gear 12, which drives a dial-shaft 13, through an interposed gear 14 and I make use of this rotating dial-shaft 13 in carrying out my invention, as will now be explained.

In the present instance the pipe 15, to the meter has a goose neck shaped inlet 16 from which the gas passes from the supply into the intake side of the meter and adjacent to this inlet I provide a rock-shaft 17 which latter carries an arm 18, on which a valve 19, is mounted.

This valve is sustained by the arm 18, so it may be moved toward or from the supply-inlet 16. The valve may be arranged to entirely close the inlet, or to partially close the same and merely cut down the flow of gas from said inlet,—it being evident that the position of the arm 18 on the rock-shaft will effect a complete or a partial stoppage of the inlet as may be desired.

The rock-shaft 17, also carries in this instance, a notched pawl or dog 20, through which the shaft may be rocked, as will presently be explained.

By reference to Fig. 1 it will be noted that the dial-shaft 13 carries a gear 21, which meshes with and drives an idler gear 22 while the idler drives a gear 23 at one end of a long pinion 24.

This pinion 24 will therefore be driven from the dial-shaft 13 and will rotate as long as gas or other fluid is passing through the meter and being consumed or used. The speed of rotation of this pinion 24, will vary with the volume of gas or fluid passing through the meter. If a small volume of gas is being used the dial-shaft 13 will travel slowly and the pinion rotation will be correspondingly slow, whereas the use of a greater volume of gas or other fluid will cause a more rapid rotation of the dial shaft and also of the pinion which it drives.

At one side of the pinion 24, and extending parallel therewith is a shaft 25 which latter is provided with external screw-threads 26. The screw-thread on this shaft 25 does not extend to the two ends thereof but terminates short of those ends so that at one end of the screw the shaft has a circumferentially smooth portion 27, while at the other end of the screw said shaft has another circumferentially smooth portion 28.

A loose collar 29 is carried on the smooth end 27 of the shaft 25, and a coiled spring 30, encircles said latter smooth shaft-end and forms a yielding abutment for said collar.

At the opposite end of the shaft 25, a loose collar 31, is mounted on the smooth portion and is yieldingly pressed forward by a spring 32.

The shaft 25, is revolved at substantially a uniform rate of speed so as to produce a given number of revolutions in a predetermined time period and the rotation of this shaft is uniform regardless of the slow or rapid rotation of the pinion 24, or the volume of gas that is being consumed.

Any suitable means such as a motor or clock mechanism, indicated diagrammatically at 33, may be utilized to rotate the threaded shaft 25 uniformly, it only being desirable that the rotation be as uniform as an ordinary clock mechanism will produce.

On the threaded shaft 25, I mount a traveler, head or disk 34, which latter is internally threaded so as to engage the screw-threads 26.

This head in this instance, has the form of a circular disk and its periphery is provided with an endless series of teeth 35, which latter mesh with the teeth on the long pinion 24, as clearly shown in Fig. 6 of the drawing.

It is therefore to be understood that the head or disk has threaded engagement with the threaded portion 26 of the shaft and also has a circumferentially geared engagement with the pinion 24.

The pinion 24 will travel in one direction while the shaft 25, will rotate in a reverse direction, and the difference between the speed of rotation of the pinion and shaft is utilized by me to cause the disk 34 to move forward or rearward on the shaft 25 or to be so rotated by the pinion 24, as to be prevented from either a forward or a rearward movement on the said threaded shaft.

In case a clock mechanism 33 is employed as the motor to drive the shaft 25, a key 36, may be employed to wind the same, but any form of motor-drive or power-means may be employed to drive said shaft or to wind the clock if used.

The operation is as follows:

Upon starting the apparatus the disk or head 34, will be located on the smooth portion 27 of the shaft 25 with the collar 29, pressing it toward the entering end of the screw-threads 26, while the teeth 35 of the disk will mesh with the teeth of the pinion 24.

The pinion will rotate slowly or fast according to the flow of gas or fluid through the meter, because it is driven from the meter mechanism.

The speed of the rotary shaft 25, which is substantially uniform, will be such that as long as only the precise proportion of the allotted quantity of gas or a less amount is being used by the consumer, which means that the speed of the pinion is equal to or less than the speed of the shaft, the head 34, will not be advanced on the thread of said shaft 25. If however, a quantity of gas in excess of the proportion of the allotted quantity is being used by the consumer, the pinion will travel faster than the constant speed of the shaft 25, and the disk 34, will be rotated by the pinion so as to cause it to advance on the screw-threads 26, of the shaft, and if this excess consumption of gas is continued, the disk will advance to the discharge-end of the threaded shaft before the expiration of the predetermined time-period where it will engage the pawl or dog 20, and actuate the latter. Upon actuating this dog 20, the shaft 17, will be rocked; arm 18 and valve 19 will be raised and the elevation of the valve will cause the supply of gas at the inlet 16 to be reduced or entirely cut off as desired so that further use of an excess volume of gas will be prevented.

This cut-off or reduction of the supply of gas will be maintained if the consumer attempts to use more gas, but if he discontinues or sufficiently reduces the consumption, the pinion 24 will revolve slowly while the shaft 25, will revolve more rapidly with the result that the disk 34 will be caused to travel rearwardly on the shaft 25 and again actuate the dog 20, but in a reverse direction, which will return the rock-shaft 17, the arm 18 and valve 19 to their normal positions and thus open the supply inlet 16.

If the use of the gas is discontinued for a sufficient length of time, the shaft 25, will cause the disk to return along the shaft to the smooth end 27 of the latter.

It is therefore to be understood that a consumer may be prevented from using any considerable quantity of gas in excess of that allotted to him in a given time period, because, while he may use his entire allotment in a short time, his supply will be cut down or entirely cut-off when he has consumed his allotted volume within a predetermined time period or within any part of that period,—the rotation of the shaft 25, being the time determining element in the structure because its speed of rotation is substantially uniform.

I have in this specification made use of the terms uniform and uniformly with respect to the shaft 25, and it is to be understood that such expressions are to be construed with some elasticity, and that a structure wherein the rotation or movement of the timing element might vary somewhat, because of inaccuracies in the structure or for other reasons, will still come within the purview of my inventions and the appended claims.

In the specification and some of the claims I have made use of the terms uniform, uniformly and constant, in connection with the speed of rotation of the shaft 25.

It should, of course, be understood that these expressions mean that the shaft 25, when operating, is rotated at a uniform and constant speed,—it being understood of course that if the meter is cut off and no fluid is passing that it is not necessary that the shaft 25 shall continue to operate after the traveler or head 29 has been returned to the position farthest away from the valve-operating dog 20.

Having described my invention, I claim,—

1. In a mechanism for controlling the flow of a fluid and other substances as set forth including a variably-actuated mechanism controlled by the amount of the fluid passing, a uniformly-actuated timing mechanism, an element influenced by both of said mechanisms and moved by the variable mechanism as the fluid flow is increased and means actuated by said element for controlling the flow of the fluid.

2. In a mechanism for controlling the flow of a fluid and other substances including a variably-actuated mechanism controlled by the amount of the fluid passing, a uniformly-actuated mechanism, an element operated upon by both of said mechanisms said element being moved by the uniformly-actuated mechanism when the fluid flow is reduced, and means operated by said element when an excess amount of the fluid flow is maintained to reduce the fluid flow.

3. In a mechanism for controlling the flow of a fluid and other substances including a variably-actuated mechanism controlled by the amount of the fluid passing, a uniformly-actuated timing mechanism, a traveling element which is moved in one direction by the variably-actuated mechanism when the fluid flow is increased and which is moved in a reverse direction by the uniformly-actuated mechanism when the fluid flow is materially reduced, and a device actuated by the traveling element when an excess fluid flow is maintained to reduce the flow.

4. In a mechanism for controlling the flow of a fluid and other substances including a variably-actuated rotating mechanism controlled by the amount of the fluid passing, a uniformly-actuated rotary mechanism, an element operated upon by both of said rotating mechanisms and a device actuated by said latter element when an excess fluid flow is maintained to reduce the flow.

5. In a mechanism for controlling the flow of a fluid and other substances including a variably-actuated mechanism rotated at a speed which varies with the amount of the fluid passing, a mechanism rotated uniformly irrespective of the fluid flow, an element having a threaded engagement with one of said mechanisms and also having a geared engagement with the other of said mechanisms said element being movable in one direction or the other according to the relative speeds of rotation of the two mechanisms and a device operated through the movement of the said element when an excess fluid flow is maintained to reduce the flow.

6. In a mechanism for controlling the flow of fluids and other substances including a device which is moved slowly or fast according to the amount of fluid that is being passed, a device that has a uniform movement irrespective of the amount of fluid that is passed, means for varying the amount of the fluid, and means coacting with both of the two first-named devices and in turn controlling the flow-varying device.

7. In a mechanism for controlling the flow of fluids and other substances including a variably-actuated pinion that is controlled by the amount of fluid passing, a uniformly-actuated timing mechanism that is independent of the pinion, a device acted upon by the pinion and also acted upon by the timing mechanism said device being moved in one direction when the fluid flow is increased and moved in a reverse direction when the fluid flow is cut down, and a means actuated by said device to cut down the amount of passing fluid when an allotted amount of fluid has passed within a predetermined time period.

8. In a mechanism for controlling the flow of fluids and other substances including a variably actuated pinion that is controlled by the passing fluid, a uniformly rotating threaded shaft, a device having threaded engagement with the shaft and also having engagement with the pinion whereby the speed of the pinion will cause the device to move in one direction or the other on the shaft, and means operated by the said device when the latter has advanced on the shaft to reduce the fluid flow.

9. A structure for controlling the flow of fluid and other substances including a mechanism which is actuated through the passing of the fluid and which varies therewith, a uniformly-actuated mechanism, and means influenced by both of said mechanisms and moved in one direction or another through the difference in the motions of said two mechanisms.

10. A structure for controlling the flow of fluid and other substances including a variable speed mechanism actuated through the passing of the fluid, a constant speed mechanism, and a device moved in one direction or another through the difference in the motions of said two mechanisms said device serving to effect a control of the amount of fluid passed.

11. A device for controlling the flow of fluid and other substances including a structure through which the fluid passes, a mechanism actuated by and varied in its motion in accordance with the amount of fluid passing, a constant speed mechanism and a device subject to both of said mechanisms for cutting off the supply of fluid to the first-named structure.

12. A device for controlling the flow of fluid and other substances including a structure through which the fluid passes, a mechanism which is variably actuated according to the amount of fluid flow, a constant speed mechanism and means controlled through the relative differences in the motions of said two mechanisms for controlling the supply of fluid to said first-named structure.

13. A device for controlling the flow of fluid and other substances including a structure through which the fluid passes, a mechanism which is variably actuated according to the amount of fluid flow, a mechanism timed in its movement, and means moved in a direction which will retard the flow of fluid to said structure if the movement of the variable mechanism is maintained at a speed in excess of the speed of the timing mechanism.

In testimony whereof I affix my signature.

ALTEN S. MILLER.